United States Patent [19]

Obendorf et al.

[11] 4,210,687
[45] Jul. 1, 1980

[54] METHOD FOR THE COATING OF GLASS SURFACES

[75] Inventors: Johann Obendorf, Dorsten; Günter Dörmann, Bochum; Rainer Gras; Elmar Wolf, both of Herne, all of Fed. Rep. of Germany

[73] Assignee: Chemische Werke Huls Aktiengesellschaft, Herne, Fed. Rep. of Germany

[21] Appl. No.: 940,020

[22] Filed: Sep. 6, 1978

[30] Foreign Application Priority Data

Sep. 7, 1977 [DE] Fed. Rep. of Germany ....... 2740253

[51] Int. Cl.² .................... B65D 11/22; B05D 3/02
[52] U.S. Cl. ............................ 428/35; 215/DIG. 6; 427/29; 427/302; 427/314; 427/386; 427/407.2; 428/417; 428/429; 428/447; 428/448; 528/45
[58] Field of Search ............... 427/386, 385 A, 314, 427/11, 13, 29, 301, 302, 407 A, 387; 428/35, 417, 423, 429; 215/DIG. 6, 12 R; 528/45; 156/326, 329, 330, 331, 86

[56] References Cited

U.S. PATENT DOCUMENTS

| | | | |
|---|---|---|---|
| 2,854,354 | 9/1958 | Gottlieb | 427/301 |
| 3,708,321 | 1/1973 | Spieles | 427/29 |
| 3,926,875 | 12/1975 | Tsugukuni et al. | 528/45 X |
| 4,060,655 | 11/1977 | Johannes et al. | 427/29 X |
| 4,092,953 | 6/1978 | Waugh | 427/385 A X |
| 4,096,291 | 6/1978 | Dunwald et al. | 427/385 A X |

*Primary Examiner*—Ronald H. Smith
*Assistant Examiner*—Thurman K. Page

*Attorney, Agent, or Firm*—Oblon, Fisher, Spivak, McClelland & Maier

[57] ABSTRACT

A method for the coating of glass surfaces in order to prevent the scattering of glass particles upon bursting, with a transparent, duroplastic protective coat by depositing a paste of hydroxy group-containing 1,2-epoxy compounds with at least one 1,2-epoxide group in the molecule and a lower melting point of more than 40° C. and hardening agents, and hardening the overlay at higher temperatures; which comprises first treating the clean glass surface with an aqueous or alcoholic silane skim coat, drying said surface if necessary and thereafter warming said surface to a temperature up to 120° C., coating the glass surface with said paste of hydroxy group containing 1,2-epoxy compounds and hardening said paste with further addition of heat, wherein said hardening agents are polyisocyanates blocked with cyclic amidines of the general formula

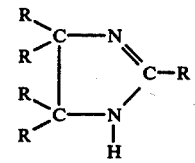

wherein the R's are the same or different substituents selected from the group consisting of hydrogen, alkyl-, cycloalkyl-, arylalkyl- and aryl, wherein the hardening agent is added in an amount of 2-15% by weight, calculated with respect to the amount of 1,2-epoxide compounds.

9 Claims, No Drawings

METHOD FOR THE COATING OF GLASS SURFACES

BACKGROUND OF THE INVENTION

1. Field of the Invention

The present invention relates to a process for the coating of glass surfaces, especially glass bottles with a strongly adhering homogeneous and transparent synthetic coat.

2. Description of the Prior Art

The coating of glass surfaces, especially glass bottles with a strongly adhering, homogeneous and transparent synthetic coat, bestows upon the bottles an extraordinary safety upon their filling with carbonic acid containing beverages, such as mineral water, beer, fruit juices, etc., as well as prolonging the durability of multi-way bottles. Upon the influence of strikes and impacts, and also upon heating under the sun or by other heat sources, unprotected bottles have readily exploded in the past, resulting as a consequence in various severe bodily injuries, especially eye injuries on humans.

Some of the previously known coatings used for these purposes have the disadvantage, that the coating overlay becomes turbid after repeated cleanings, which effect can be attributed in thermoplastic materials possibly to a post-crystallization effect of the synthetic material. Such bottles convey a negative impression optically and are therefore psychologically undesirable from the viewpoint of marketing. Various coating materials have the disadvantage of being susceptible to oxidation, which leads to embrittlement of the overlay coat and therefore, especially in the case of multi-way bottles to a loss in the ability to protect against splintering.

SUMMARY OF THE INVENTION

It has now been found, that glass surfaces, especially glass bottles, can be coated without these and other disadvantages, when one employs a method for the coating, and for the prevention of scattering of glass particles upon bursting, whereby a transparent, duroplastic protective coat of preferably more than 50 microns is formed by depositing a paste of hydroxy group-containing 1,2-epoxy compounds with at least 1,2-epoxy group in the molecule and a lower melting point of more than 40° C. and hardening agents as well as usual processing agents and hardening of the overcoat by higher temperatures wherein the clean glass surface is first treated with an aqueous or alcoholic silane skim coat, the glass surface if necessary is dried, it is then warmed to a temperature up to 120° C., the paste is coated on the glass surface by known methods, wherein as hardening agents one uses polyisocyanates blocked with cyclic amidines of the general formula

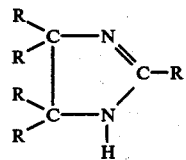

wherein, R's can be equal or different substituents selected from the group of hydrogen, alkyl-, cycloalkyl-, aralkyl- and aryl radicals, wherein the hardening agent is added in an amount of 2-15% by weight, relative to the amount of 1,2-epoxy compound; and upon further addition of heat, said coating paste is hardened. The cyclic amidine-blocked polyisocyanate can, in the case of a diisocyanate, be described by the following general formula:

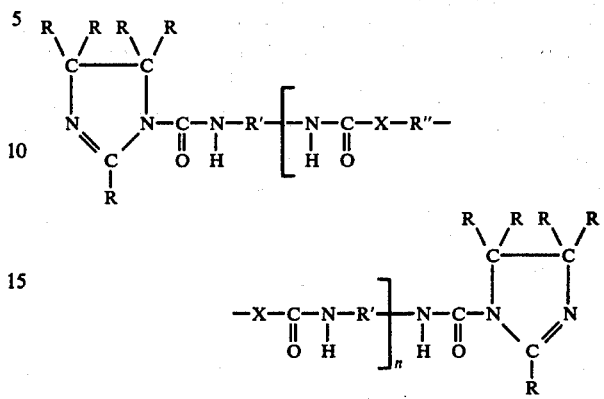

wherein, n equals 0 or 1, X equals oxygen, sulfur or a NH group, R can be equal or different radicals selected from the group of hydrogen, alkyl-, cycloalkyl-, aralkyl- and aryl radicals, R' is an alkylene-, cycloalkylene- or arylene radical, and R'', if necessary, can be a substituted, by 1 or more alkyl radicals, whereby more than one radical can mutually join to a cycloaliphatic ring, saturated or unsaturated alkylene radical with 2-18 atoms, which can optionally contain one or more oxygen- or sulfur atoms in the hydrocarbon chain, or R'' can be a cycloalkylene radical.

DESCRIPTION OF THE PREFERRED EMBODIMENTS

The hardening agents of the present invention are excellently compatible with most epoxy resins and yield at higher temperatures homogeneous melts, which are very appropriate for the preparation of coating pastes. The hardening mixtures of the present inventions are storage-stable at room temperature; the hardening times lie, according to the hardening temperature in the range of 5-25 minutes. The hardening mechanism is apparently complex. On the one hand, the homopolymerization of the 1,2-epoxy groups is catalyzed by the basic N of the compounds of the present invention, on the other hand during hardening, there occurs a deblocking of the hardening agent into cyclic amidines and polyisocyanates. The thus freed amidines catalyze the homopolymerization of the 1,2-epoxy groups, while the freed NCO-groups undergo reaction with the OH-groups of the epoxy resin in order to form urethanes therewith. The formation of oxazolidones by reaction of the NCO-groups with epoxide groups is possibly not negligible either. The hardened coatings and overlays, are characterized by very satisfactory chemical and mechanical properties. For the preparation of the compositions of the present invention, which can be utilized as coating pastes, it is particularly appropriate to use hydroxy group-containing 1,2-epoxy compounds with more than one 1,2-epoxy group in the molecule and with a lower melting point of higher than 40° C.; that is, compound which show these characteristics, such as on the one hand polyepoxide compounds, which are solid at 40° C. and higher, and which include higher molecular weight compounds (so called solid resins) and such compounds which on account of their symmetrical construction or by the size of the hydrocarbon systems which are bound to the 1,2-epoxy groups are solid; and on the other hand, such compounds, which by reaction of liquid 1,2-epoxy compounds with more than one epoxide group per molecule, will give adducts with primary or secondary amines, wherein the amines are used in such amounts that the adduct at least contains on the average still more than one 1,2-epoxy group per molecule.

The 1,2-epoxy compounds can be saturated as well as unsaturated aliphatic, cyclo aliphatic, aromatic and heterocyclic. They can further contain such substituents, which under mixture- and reaction conditions will not yield any interferring side reactions. No interferring side reactions are given by alkyl- or aryl- substituents, ether groups and the like.

Of the solid resins, it is preferred to use for this purpose, 1,2-epoxy compounds with more than one epoxy group in the molecule, which have an epoxy equivalent weight between 500–2000.

These are the solid, polymeric polyglycidylpolyethers of 2,2-bis-(4-hydroxyphenyl)-propane, which are for example obtained by the reaction of 2,2-bis-(4-hydroxyphenyl)-propane with epichlorhydrin in a mole ratio of 1:1.9–1.2 (in the presence of an alkali hydroxide in aqueous medium). Polymeric polyepoxides of this type can also be obtained by the reaction of a polyglycidyl ether of 2,2-bis-(4-hydroxyphenyl)-propane with less than the equimolecular amount of a bifunctional phenol, preferably in the presence of a catalyst, such as a tertiary amine, a tertiary phosphine or a quarternary phosphonium salt. The polyepoxide can also be a solid epoxidized polyester, such as those for example obtained by reaction of a multi functional alcohol and/or a multi basic carboxylic acid or an anhydride thereof with a low molecular weight polyepoxide. Examples of such polyepoxides with low molecular weight are liquid diglycidylethers or 2,2-bis-(4-hydroxyphenyl)propanes, diglycidylphthalates, diglycidyladipates, diglycidyltetrahydrophthalates, diglycidylhexahydrophthalates, diglycidylmaleates and the 3,4-epoxycyclohexylmethyl ester of 3,4-epoxycyclohexanecarboxylic acid.

Mixtures on the basis of solid polyepoxides can also be used if necessary, for example, a mixture of a polyepoxide, with a melting point between 120° and 160° C., and a polyepoxide with a melting point between 60° and 80° C. (melting points are determined according to the mercury method of Durrans). Appropriate mixtures contain between 30 and 50% by weight of a solid polyglycidyl ether of 2,2-bis-(4-hydroxyphenyl)-propane with an epoxy equivalent weight between 1650 and 2050 and a melting point of from 120° to 160° C. and between 50 and 70% by weight of a solid polyglycidyl polyether of 2,2-bis-(4-hydroxyphenol)-propane with an epoxy equivalent weight between 450 and 525 and a melting point of from 60° to 80° C.

The cyclic amidine-blocked polyisocyanates of the present invention wherein said cyclic amidine is described by the above mentioned general formula, can be prepared by a reaction at temperatures of from 0°–150° C., preferably at 80°–120° C., wherein the polyisocyanate and the cyclic amidines are added in such amounts that to one isocyanate group, corresponds 0.5–1.1, preferably 0.8–1.0 moles of cyclic amidine. The appropriate reaction temperature should be below the decomposition temperature.

The reaction can be carried out either in solvents, in the melt, and also in an excess of polyisocyanate.

As starting materials which can be used for the blocking with cyclic amidines, it is appropriate to use polyisocyanates, especially diisocyanates such as aliphatic, cyclo aliphatic, araliphatic, that is aryl substituted aliphatic, and/or aromatic diisocyanates, such as the ones described for example in Houben-weyl, Methods of Organic Chemistry, volume 14/2, pages 61–70, and in the article of W. Seifken in Justus Liebigs Annalen der Chemie, 562, 75–136, such as 1,2-ethylenediisocyanate, 1,4-tetramethylenediisocyanate, 1,6-hexamethylenediisocyanate, 2,2,4- or 2,4,4-trimethyl-1,6-hexamethylenediisocyanate (TMDI), 1,12-dodecanediisocyanate, ω,ω'-diisocyanatodipropylether, cyclobutane-1,3-diisocyanate, cyclohexane-1,3- and 1,4-diisocyanate, 3-isocyanatomethyl-3,5,5-trimethylcyclohexylisocyanate, which is also named as isophorondiisocyanate and abbreviated as IPDI, 2,5- or 2,6-bis-(isocyanatomethyl-)bis cyclo-[2.2.1]-heptane, decahydro-1,4-methano-naphthalene-2 (or 3) 5-ylendimethylene-diisocyanate, hexahydro-4-7-methanoindane-1- (or 2) 5-(or 6)-ylendimethylenediisocyanate, hexahydro-1,3- or 1,4-phenylene-diisocyanate, 2,4- and 2,6-hexahydrotoluylendiisocyanate, perhydro-2,4' and/or -4,4'-diphenyl-methane-diisocyanate, ω,ω'-diisocyanato-1,4-diethyl-benzene, 1,4-phenylenediisocyanate, 4,4'-diisocyanato-diphenyl, 4,4'-diisocyanato-3,3'-dichloro-diphenyl, 4,4'-diisocyanato-3,3'-dimethoxydiphenyl, 4,4'-diisocyanato-3,3'-dimethyl-diphenyl, 4,4'-diisocyanato-3,3'-diphenyl-diphenyl, 4,4'-diisocyanato-diphenylmethane, naphthalene-1,5-diisocyanate, toluylenediisocyanate, toluylene-2,4- or 2,6-diisocyanate, N,N'-(4,4'-dimethyl-3,3'-diisocyanatodiphenyl)-uretdione, m-xylylenediisocyanate, and also triisocyanates such as 2,4,4'-triisocyanato-diphenylether, 4,4',4''-triisocyanato-triphenylmethane, tris-(4-isocyanato-phenyl)thiophosphate, as well as appropriate mixtures of these components. Further appropriate isocyanates can be found in the above-mentioned articles in the Annalen at pages 122 and following.

Especially appropriate in the state of the art are the easily available aliphatic or cyclo aliphatic diisocyanates and especially the 1,6-hexamethylenediisocyanate, the 3-isocyanato-methyl-3,5,5-trimethylcyclohexylisocyanate and 2,4-hexahydrotoluylenediisocyanate as well as isomeric mixtures thereof. Besides of the monomeric polyisocyanates, it is possible to use as starting materials for the blocking with the below specifically described imidazolines obviously dimers and trimers of said polyisocyanates, such as uretdiones, biurets, isocyanurates and urethane adducts, which can be prepared by known methods. Under polyisocyanates, in the sense of the present invention it is also understood that those can be used which before the blocking with imidazolines, can undergo a molecular enlargement with chain elongators known in isocyanate chemistry, such as water, polyols, polyamines, and the like, wherein the bi- or trifunctional chain elongation agent, that is, such which contain groups such as hydroxy- and/or amino groups, which are reactive towards isocyanate groups, is used in such amounts that the resulting new isocyanate contains on the average at least two isocyanate groups. Upon use of water as the chain elongation agent, the resulting polyisocyanate contain one or more ureido groups.

Appropriate polyols are for example diols and triols, such as for example ethylene glycol, propylene glycols, such as 1,2- and 1,3-propanediol, 2,2-dimethyl-propanediol-(1,3)butanediols, such as butanediol-(1,4), hexanediols such as for example hexanediol-(1,6), 2,2,4-trimethylhexanediol-(1,6), 2,4,4-trimethylhexanediol- (1,6), heptanediol-(1,7), octadecene-9,10-diol-(1,12), thiodiglycol, octadecanediol-(1,18), 2,6-dimethyl-2-propylheptanediol-(1,3), butane- or butynediol-(1,4), diethyleneglycol, triethyleneglycol, trans- and cis-1,4-cyclohexanedimethanol, 1,4-cyclohexanediol, glycerine, hexanetriol-(1,2,6), 1,1,1-trimethylolpropane, 1,1,1-trimethylolethane, and the like. It is also possible to use mixtures of the above mentioned compounds.

As appropriate chain elongating agents or molecular enlargening agents such as polyamines, it is possible to use for example ethylenediamine-1,2, propylenediamine-1,2 and -1,3, butylenediamine-1,2, -1,3 and 1,4 as well as hexamethylenediamines, which contain one or more $C_1$-$C_4$-alkyl radicals, such as 2,2,4- or 2,4,4-trimethylhexamethylenediamine-1,6 and the like, and 3-aminomethyl-3,5,5-trimethylcyclohexylamine, which is abbreviated as IPD.

Appropriate imidazoline derivatives in the sense of the present invention which are those described by the above-mentioned formula are, for example, those with optionally containing aryl-substituted alkyl radicals, with optionally containing alkyl substituted aryl radicals, such as 2-methylimidazoline, 2,4-dimethylimidazoline, 2-methyl-4-(n-butyl)-imidazoline, 2-ethylimidazoline, 2-ethyl-4-methyl-imidazoline, 2-benzyl-imidazoline, 2-phenyl-imidazoline, 2-phenyl-4-methyl-imidazoline, 2-phenyl-4-(N-morpholinylmethyl)-imidazoline, 2-(o-tolyl)-imidazoline, 2-(p-tolyl)-imidazoline, and the like. It is also possible to use mixtures of said imidazoline-derivatives according to the present invention. This is particularly useful when it is necessary to use blocked isocyanates with lower melting points or -ranges.

The reactive imidazoline-derivatives of the present invention can be prepared according to known methods from substituted diamines and aliphatic or aromatic mononitriles if necessary in the presence of elementary sulfur or sulfuryl chloride as catalysts.

The blocking reaction can, as already mentioned, take place in solvent. As solvent for this reaction it is possible to use those solvents that do not react with polyisocyanates, such as for example ketones such as acetone, methylethylketone, methylisobutylketone, cyclopentanone, cyclohexanone and others; aromatics such as benzene, toluene, xylene, chlorobenzene, nitrobenzene and others; cyclic ethers such as tetrahydrofuran, dioxane and others; esters such as methylacetate, n-butylacetate and others; aliphatic chlorohydrocarbons such as chloroform, carbon tetrachloride and others as well as aprotic solvents such as dimethylformamide, dimethylacetamide, dimethylsulfoxide and the like.

When the blocking agent is added in a ratio $\geq 1$ to the number of isocyanate groups, then the reaction mixtures are kept at the determined temperatures as long as necessary until the NCO-content of the reaction mixture falls to a value of less than 0.2% NCO, and for ratios <1 until the achievement of a constant NCO-value.

It is also possible to use in the present invention blocked isocyanates which can be obtained by the additional reaction of a group of blocked polyisocyanates, namely those wherein less than stochiometric amounts of cyclic amidines have reacted therewith, that is, where the ratio of cyclic amidine to isocyanate group was <1:1, with the same chain elongation agents which earlier had been described as agents for the molecular enlargement. The reaction takes place at temperatures in the range of 0°-150° C., preferably 80°-120° C., however still below the deblocking temperature of blocked polyisocyanate. Through these blocked polyisocyanates it is possible to prepare coating agents, which fulfill practical requirements within very broad limits. This variant of the method is preferably of interest for polyisocyanates with differentially reactive NCO-groups.

It is therefore possible to obtain by a change in the sequence of adduct formation/blocking, blocked polyisocyanates with different reactivity, melting range and structure.

The amount of the hardening agent which is added to the cyclic amidine-blocked polyisocyanate can interestingly be varied within wide ranges. It is possible to obtain excellent results upon utilization of 2-15 parts by weight, preferably 6-12 parts by weight of hardening agent, calculated on the basis of the added solid 1,2-epoxy compound. Higher additions are unnecessary from practical and economical standpoints.

For the improvement of the flowing properties of the coating pastes, it is possible to add at preparation so called flowing agents. These agents can be various chemical compounds or their mixtures belonging to a variety of different chemical areas; for example polymeric or monomeric compounds; acetals, such as polyvinylformal, polyvinylacetal, polyvinylbutyral, polyvinylacetobutyral or
Di-2-ethylhexyl-i-butyraldehyde-acetal;
Di-2-ethylhexyl-n-butyraldehyde-acetal;
Diethyl-2-ethylhexanol-acetal,
Di-n-butyl-2-ethyl-hexanol-acetal;
Di-i-butyl-2-ethylhexanol-acetal;
Di-2-ethylhexyl-acetaldehyde-acetal and others.

Ethers, such as polymeric polyethylene- and polypropyleneglycols, mixed polymerizates of n-butylacrylate and vinylisobutylether, ketone-aldehyde-condensations resins, solid silicon resins and also mixtures of zinc soaps of fatty acids and aromatic carboxylic acids and other can also be used. For this purpose, it is also possible to use commercial products such as Modaflow ®, with a chemical character which is unknown to the users and of which it is known that it is a complex, polymeric, useful liquid.

Such flowing agents can be added in amounts of from 0.2-5% by weight taken on the basis of the total amount of the coating paste.

The other components of the heat hardening coating pastes, such as pigments, soluble dyes, fillers, thixotropic agents, UV- and oxidation stabilizers and others, can be added on the basis of the 1,2-epoxy compounds within a relatively wide range. The added amounts also depend on the requirements of the quality of the overcoats.

The preparation of the overcoat paste takes place in that one mixes the solid 1,2-epoxy compounds and hardening agents, and if necessary after addition of the known lacquer additives, in the mentioned proportions and extrudes them at a temperature at least 30° C. below the splitting temperature of the hardening agent, and additionally grinds them by addition of powdery lacquers to a grain size smaller than 0.25 mm, preferably $<100\mu$, and a grain maximum size between 20 and $60\mu$, preferably between 30 and $50\mu$, and if necessary the coarser fraction is separated by sifting.

According to the present method, a clean glass surface, such as for example a glass bottle, is first treated with an aqueous or alcoholic silane skim coat. For this treatment, silanes are used which contain radicals of two different correlated functional groups. These are first lower alkoxy groups, especially ethoxy or methoxy radicals, which are reactive with the OH-groups of the glass surface and second, organic radicals with such functional groups which are reactive either with the 1,2-epoxy compounds, such as amino groups or with the hardener, such as for example epoxy groups, glycidyl radicals and others, such as γ-aminopropyl-trimethoxy-silane, γ-aminopropyl-triethoxy-silane, glycidyl oxypropyl-trimethoxy silane, glycidyl oxypropyl-triethoxy-silane, etc. It is also possible to use mixtures with similar functional radicals, that is mixtures which contain reactive groups reactive with epoxide groups or with hardening agent reactive groups. The treatment of the glass surface can for example be done by an immersion in or by a spring with the skimming coat medium. These so treated bottles can then be additionally separately dried. This drying can be simultaneously carried out by warming the bottle to a temperature up to 120° C., that is, at a temperature which occurs during the cooling process in bottle manufacturing.

The coating of the above described coating paste on the warmed glass bottles occurs according to known methods, that is when using powdery lacquers, through electrostatic powder spraying, through vortex sintering or electrostatic vortex sintering etc. or by melts for example through enveloping the rotating bottles with the molten film. The appropriate deposition method is dependent on the glass body to be coated.

The immediate melting of the powder which is in the melting range of 100° C., yields an excellent, transparent flow of the film.

After the deposition of the coating mass according to one of the described methods, the lacquered glass surfaces are in order to bring about hardening by heating to temperatures of from 130°-200° C., preferably 140°-180° C. After this, the resulting coating possess the described advantages.

The coating thicknesses of the hardened coats can be adjusted according to the requirements of the glasses to between 50 and 250 μm.

The thus deposited protective coat is highly elastic and possesses and excellent adhesion, so that during breaking of the glass or explosion of the bottle the glass splinters cannot force themselves out. The bottle shape remains fully preserved after destruction of the glass bottle. The appearing kinetic energy is transformed through the stretching and heating of the synthetic coating.

A special advantage of the coating is its resistance against hot, alkali-containing wash lyes, with which the bottles are cleaned prior to their filling with beverage. This is particularly relevant to multi-weight bottles which are subject to an intensive cleaning prior to each filling operation.

The advantage of the coatings of the present invention lies in that even after repeated washing in hot, alkaline washing lye, they undergo no softening of the material and no loss in adherence. Optically there are no changes either.

The glass bottles coated with the synthetic coating material of the present invention can be used without further precautions as containers for carbonic acid-containing beverages, since there is no danger of explosion upon their breaking.

The lifetime of a coated bottle when used as a multi-way bottle is longer than that of an uncoated bottle, which on account of the rubbing against sharp edges which occurs during the movement and on account of the washing operations in hot solutions, are strongly worn on the surface and can be damaged.

Another object of the invention are the glasses, glass bodies such as bottles which are coated with a transparent, duroplastic protective coat.

Having generally described this invention, a further understanding can be obtained by reference to certain specific examples which are provided herein for purposes of illustration only and are not intended to be limiting unless otherwise specified.

GENERAL DESCRIPTION OF THE APPLIED METHODOLOGY

Uncoated and clean glass bottles or glass plates of 5 mm strength were coated with an aqueous or alcoholic γ-amino-propyl-triethoxy-silane solution (1.5% by weight) at room temperature so as to give a monomolecular coating and were thereafter dried.

The utilized 1,2-epoxy compounds with the special characteristics, which in the practice are in general described as epoxy resins, were mixed with the cyclic amidine-blocked polyisocyanate as well as with the crosslinker and also the hardener, and the flowing agent in the given weight proportions, extruded and thereafter ground. The particle size of the powder composition was <100 μm. The frequency distribution of the particle sizes was in the range of from 30-50 μm as a maximum. These finally particular mixtures were then deposited on the previously warmed glass surfaces through electrostatic powder spraying and thereafter were dried at the given temperatures and times. The properties of the obtained coats were then determined by the tests described further on.

PREPARATION OF THE BLOCKED POLYISOCYANATE

A. (With 2-phenylimidazoline blocked-IPDI)

To a mixture of 222 parts by weight isophorondiisocyanate (IPDI) and 300 parts by weight of water free acetone, was added at room temperature slowly 292 parts by weight of 2-phenylimidazoline, which had been dissolved in 500 parts by weight of water free acetone. After the addition of 2-phenylimidazoline was ended, the mixture was heated for one hour at 50° C. The acetone was then distilled. The last remnants of acetone were separated by drying the reaction product at 60° C. in a vacuum dessicator. The thus 2-phenylimidazoline-blocked IPDI is a white powder with a melting range of 98°-106° C. which has a softening point (DTA) of 63°-80° C. and a content of free isocyanate of 0.2% by weight. It has a splitting temperature of about 120° C.

B. (With 2-phenylimidazoline Blocked IPDI-Adduct)

a. To 444 parts by weight IPDI were added with good stirring at 80° C. slowly 106 parts by weight of diethyleneglycol. After finishing the addition of diethyleneglycol, the mixture was still heated for two hours at 80° C. The NCO-content of the IPDI/diethyleneglycol mixture showed 15.1%.

b. To 556 parts by weight of the adduct prepared under a from 2 moles of IPDI and 1 mole diethyleneglycol, were added at 120° C. and in portions, 292 parts by weight of 2-phenylimidazoline in such a way that the temperature never rose above 125° C. After finishing the addition of 2-phenylimidazoline, the reaction mixture was still heated for a further hour at 120° C. The reaction product is a light yellow powder with a melting range of 100°-106° C., a softening point (DTA) of 70°–90° C. at a free NCO-content of 0.2%. The splitting temperature is about 140° C.

C. (With 2-Phenyl-4-methylimidazoline blocked IPDI)

To a melt of 320 parts by weight 2-phenyl-4-methylimidazoline were added in dropwise fashion 222 parts by weight of IPDI in such way that the temperature in the reaction flask never rose above 120° C. In order to carry the reaction to completion, the reaction mixture was held for three hours at 120° C. These conditions were enough for an almost complete reaction. The reaction product is a white crystalline powder with a melting range of 95°–98° C. a softening point (DTA) of 65°–85° C., and a free NCO-content of 0.2%. The splitting temperature was about 140° C.

D. (With 2,4-Dimethylimidazoline-blocked IPDI)

To 222 parts by weight IPDI were added dropwise at 80° C., 196 parts by weight of 2,4-dimethylimidazoline in such way that the temperature never rose above 90° C. After ending the addition of 2,4-dimethylimidazoline, the reaction was still heated for one further hour at 100° C. The reaction product is a colorless powder with a melting range of 104°–110° C. and a softening point (DTA) of 75°–90° C. The reaction product showed no traces of NCO. The splitting temperature was 160° C.

E. (With 2,4-dimethylimidazoline blocked IPDI adduct)

To 556 parts by weight of the adduct described under B.a. from 2 moles of IPDI and 1 mole diethyleneglycol, were added dropwise at a 100° C., 196 parts by weight of 2,4-dimethylimidazoline in such a way that the temperature never rose above 110° C. After the addition of 2,4-dimethylimidazoline was ended, the reaction mixture was further heated for two hours at 110° C. In the so formed reaction product it was not possible to show any traces of NCO. The reaction product is a colorless powder with a melting range of 100°–107° C. and a softening point of 60°–95° C. The splitting temperature was about 170° C.

EXAMPLE 1

The 2-phenylimidazoline-blocked IPDI was worked up to coating powders with the determined epoxy resin as well as a small amount of a flowing agent in the following ratio:

Composition of the Coating Powder

Solid epoxy resin on the basis of an adduct of 2,2,-bis-(4-hydroxyphenyl) propane (DIAN) and epichlorohydrin, which showed HCl-splitting and was further treated with Dian and which according to specifications of the manufacturer has an epoxide-equivalent weight of 900–1000 which yields an epoxide value of 0.10–0.11 and a melting range of 90°–100° C.: 89.4 Parts by wt.
2-Phenylimidazoline-blocked IPDI according to Example A: 9.8 Parts by wt.
Vehicle, which commercially is designated Modaflow ®: 0.8 Parts by wt.

This formulation was contacted at 200° C. with warm glass bottles and hardened for five minutes at 180° C. On the coated bottles, the following tests were carried out:
a. Visual Examination: The surface showed a polished, smooth appearance.
b. Thickness of the overcoat: 60–70 μm.
c. Bursting Pressure: The bottles exploded at an inner pressure of 22–26 atmospheres with formation of small splinters. The synthetic coating maintained the thus formed splinters fully united.
d. Test in the washing machine: The test washing lye was formed from a solution of calgonite ®*/sodium hydroxide (0.25/2.5 weight percent) and was allowed to interact for five minutes at 85° C. with the bottles. The total time of flow through the machine was about 30 minutes. The synthetic coat showed thereafter no negative changes.

*Calgonite ® = Bottle cleaning agent on the basis of sodium salt of a polyphosphate e. Test in line Simulator Bottle Temperature 80° C.: The bottles were filled at 80° C. with hot water and then allowed to stand for 10 minutes in a water bath at a temperature of 80° C. Thereafter, the heated bottles were tested for one minute in the line simulator. On the surface of the bottle-body there were, after the test, no worn spots on the synthetic overcoat.

5 × 1 minutes running time in the line simulator: The previously mentioned test was repeated five times. Damages were not detected.

f. Impact Test (Splintering Cohesion): The impact test was carried out with an impact energy of 73 kg cm. A steel ball of 80 mm cross section fell from a height of 350 mm on a perpendicularly lying empty bottle at a meeting angle of 120°. The bottles broke and were deformed due to the impact, but remained whole without any glass splinters spreading to the outside.

g. For the determination of the resistance of the coating agent to piercing, it was tested according to DIN 53 373 "Piercing Test with Electronic Measurement Determination". This test allows the determination of the flexibility and resistance of a synthetic film.

The coating thickness of the films were between 150 and 138 μm. The following test conditions were utilized:
Test form: flat film
Machine: dynatester
Test Temperature: 24° C.
Relative Humidity: 70%
Piercing Body: half bullet
Results from ten tests:

Damage force $F_s$: 14.17 kp
Damage work $W_s$: 2.67 kpcm
Piercing work $W_{ges}$: 4.05 kpcm
Damage deformation $L_s$: 5.08 mm

EXAMPLE 2

2-phenylimidazoline blocked IPDI-adduct according to Example B.b. was mixed with the given epoxide resin as well with a small amount of a flowing agent in the following ratios to give a coating powder:

Composition of the Coating Powder

Solid epoxide resin (according to Example 1): 90.0% by weight
2-Phenylimidazoline blocked IPDI-adduct: 9.2% by weight
Flowing agent (according to Example 1): 0.8% by weight This formulation was brought on to glass bottles which at the moment of coating were at a temperature of about 240° C. No after hardening was carried out.

The tests on the coated bottles were carried out as in Example 1 and the results from Example 1 were also obtained.

EXAMPLE 3

With 2-phenyl-4-methylimidazoline blocked IPDI according to Example C was prepared by addition of the epoxide resin as well as a small amount of a flowing agent in the following ratios, a coating powder:

Composition of the Coating Powder

Solid epoxide resin (as in Example 1): 89.3% by weight
2-phenyl-4-methylimidazoline blocked IPDI: 9.9% by weight
flowing agent (according to Example 1): 0.8% by weight This formulation was brought on to glass bottles which were heated to 200° C. There was no after hardening. The following tests were carried out thereafter:

a. Visual Inspection: The surface showed a smooth, blank appearance.
b. Coating thickness: 70–80 μm
c. Bursting pressure: The bottles exploded at an inner pressure of 20–24 atmosphere with formation of fine splinters. The synthetic coating held these splinters together.
d. Test in the Washing Machine: The test was carried out according to Example 1d. After the given time there was no appearance of negative changes on the synthetic coating.
e. Test in Line Simulator, Test according to Example 1e: The synthetic coating composition only showed minimal wear portions. After 5×1 minute running time no further damages were observed.
f. Impact Test (Splinter cohesion) Test according to Example 1f: The bottles broke and were deformed through the impact, but remained whole.

EXAMPLE 4

With 2-phenyl-4-methylimidazoline blocked IPDI/-diethyleneglcyol adduct, prepared according to Example B, was prepared with the given epoxide resin as well as a small amount of a flowing agent in the given amounts a coating powder. The blocked polyisocyanate gave a white powder with a melting range of 95°–100° C., a glass transition temperature (DTA) of 60°–85° C. and a splitting temperature of about 150° C. The reaction product was free of unblocked NCO-groups.

Composition of the Coating Powder

Solid Epoxide resin (according to Example 1): 88.7% by weight
2-Phenyl-4-methylimidazole blocked IPDI/Diethyleneglycol-Adduct: 10.5% by weight
Flowing agent (according to Example 1): 0.8% by weight The properties of the coated glass bottles were the same as those in Example 1.

EXAMPLE 5

With 2,4-dimethylimidazoline blocked IPDI according to Example D were mixed with the given epoxide resin as well as a small amount of the vehicle in the given amounts to form a coating powder:

Composition of the Coating Powder

Solid Epoxide Resin (according to Example 1): 93.0% by weight
2,4-dimethylimidazoline blocked IPDI: 6.2% by weight
Flowing agent (according to Example 1): 0.8% by weight The properties of the coated glass bottles were the same as those in Example 1.

EXAMPLE 6

With 2,4-dimethylimidazoline blocked IPDI/diethyleneglycol-adduct according to Example E was prepared by addition of epoxide resin as well as a small amount of a flowing agent in the following ratios a coating powder:

Composition of the Coating Powder

Solid epoxide resin (according to Example 1): 88.6% by weight
2,4-dimethylimidazoline blocked IPDI/diethylene glycol-adduct: 10.6% by weight
flowing agent (according to Example 1): 0.8% by weight These formulations were coated onto bottles which had been heated to 120° C.
Thereafter these coatings were hardened for 10 minutes at 200° C. and the following tests were undertaken:

a. Visual Examination: The coating surface showed a smooth, blank appearance
b. Coating thickness: 60–80 μm
c. Bursting Pressure: The bottles exploded at a inner pressure of 20–24 atmospheres with formation of fine splinters. The synthetic coat did not allow any of the splinters onto the outside.
d. Test in the Washing Machine: Test according to Example 1D. No negative changes after the testing time.
e. Testing in the line simulator according to Example 1E: Besides of a very light wear, the coating composition was fully recovered. After 5×1 minute running time the synthetic coats did not show any further damages.
f. Impact Test (Splintering Cohesion) Test according to Example 1F: The bottles broke and were deformed through the impact, but remained whole.

Having now fully described this invention it will be apparent to one of ordinary skill in the art that many changes and modifications can be made thereto without departing from the spirit or scope of the invention set forth herein.

What is claimed as new and intended to be covered by Letters Patent is:

1. A method for the coating of glass surfaces, in order to prevent the scattering of glass particles, with a transparent, durpolastic protective coat by depositing a paste of hydroxy group-containing 1,2-epoxy compounds, with at least one 1,2-epoxide group in the molecule and a lower melting point of more than 40° C. and a hardening agent, and hardening the overlay at higher temperatures, which comprises
first treating the clean glass surface with an aqueous or alcoholic silane skim coat,
drying said surface if necessary and thereafter warming said surface to a temperature up to 120° C., coating the glass surface with said paste of hydroxy group-containing 1,2-epoxy compounds and hardening said paste with further addition of heat wherein said hardening agents are polyisocyanates blocked with cyclic amidines of the formula:

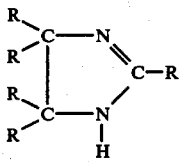

wherein R's are the same or different substituents selected from the group consisting of hydrogen, alkyl-, cycloalkyl-, arylalkyl-, and aryl, wherein the hardening agent is added in an amount of 2–15% by weight, calculated with respect to the amount of 1,2-epoxide compounds.

2. A method for the coating of glass surfaces according to claim 1, wherein said cyclic amidine-blocked polyisocyanate is a diisocyanate compound of the formula

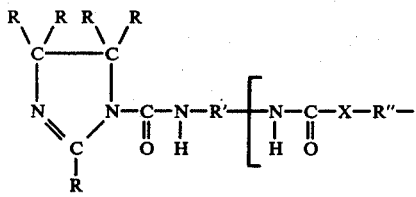

-continued

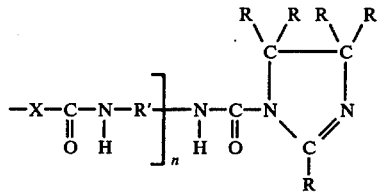

wherein, n=0 or 1; X=O, S or a NH-group, R can be the same or different radicals selected from the group consisting of hydrogen, alkyl-, cycloalkyl-, aralkyl- and aryl radicals; R' is an alkylene-, cycloalkylene, or arylene radical and R'' is a saturated or unsaturated alkylene radical with 2–18 C-atoms which if necessary may contain one or more oxygen- or sulfur atoms in the hydrocarbon chain, and which can be if necessary substituted by one or more alkyl radicals, whereby more than one radical can mutually join to a cycloaliphatic ring, or R'' is cycloalkylene radical.

3. A method according to any of claims 1 or 2, wherein the coated glass surface is hardened at a temperature in the range of 130°–200° C., preferably 140°–180° C.

4. A method according to any of claims 1–2, wherein soluble dyes are added to the coating pastes.

5. A method according to any of claims 1–2, wherein coating of the glass surfaces is carried out with powder-forming coating pastes by vortex-sintering or electrostatic vortex sintering.

6. The glass surfaces coated with a transparent, duroplastic protective coat, prepared according to the methods of any of claims 1–2.

7. A method according to claim 1 wherein said glass surface is a glass bottle.

8. The glass bottles prepared according to claim 7.

9. The method of claim 1 wherein said hydroxy group-containing 1,2-epoxide compound is a polymer of 2,2-bis-(4-hydroxyphenyl)-propane and epichlorohydrin.

* * * * *